June 15, 1937.   E. E. CLARK   2,084,079
SCREW
Original Filed Nov. 15, 1935
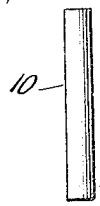
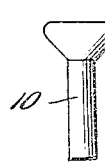
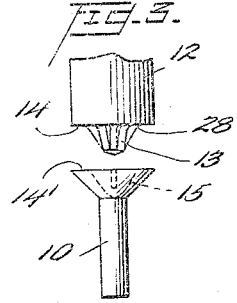
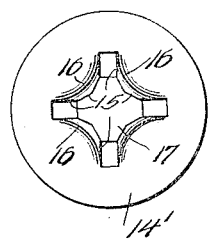
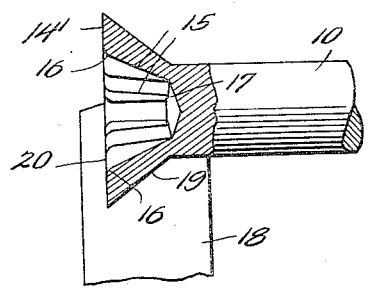
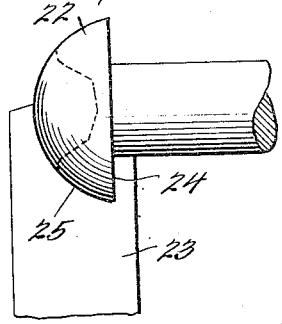
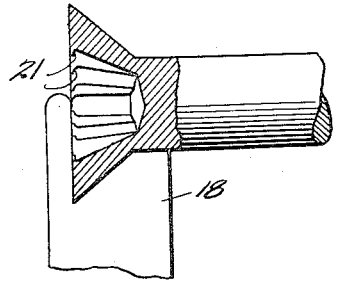
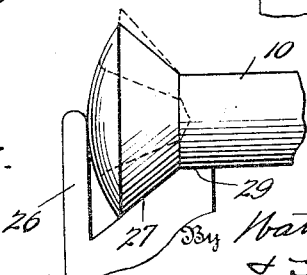
Inventor
Eugene E. Clark,
By Watson, Coit, Morse
& Grindle
Attorneys Patented June 15, 1937

2,084,079

UNITED STATES PATENT OFFICE 2,084,079

SCREW

Eugene E. Clark, Providence, R. I., assignor to American Screw Company, Providence, R. I., a corporation of Rhode Island Original application November 15, 1935, Serial No. 50,042. Divided and this application March 30, 1936, Serial No. 71,733

2 Claims. (Cl. 85—45)

This invention relates to screws and more particularly to screw heads and including particularly the formation of the head and a recess in the head for the accommodation of a screw driver.

An important feature of the invention consists in the provision of a screw having a recess of generally cruciform plan in which the intersections or junctions of the recess walls with the surface of the head of the screw are other than sharp.

Among the important advantages of the non-sharp junctions may be enumerated the following:

A. Round corners which prevent the forming of burrs in case of slippage of the screw driver.

B. A compressing and hardening of the metal resulting from the extra compression at the junctions further preventing burr formation.

C. The presenting of a rounded edge to the shaving tool used in finishing the head surfaces to prevent the turning of burrs into the recess from the action of the cutter.

D. The provision of a superior and immediately usable head finish as a result of the punching operation so that the screw can be used for rough purposes without any machining operation on the head.

Another important feature of the invention resides in the formation of a screw head with an unfinished, hard, recessed, top surface and a finished undersurface whereby a screw suitable for rough use is formed with the minimum of operations.

Other and further features and objects of the invention will be more apparent to those skilled in the art upon a consideration of the accompanying drawing and following specification wherein are disclosed several exemplary embodiments of the article and process.

In said drawing:

Figure 1 is an elevation of a blank or section of rod from which the screw is formed;

Figure 2 shows an intermediate step in the process of manufacturing a screw head and represents a partially finished head upset on the blank;

Figure 3 shows a screw in which the head is completely formed and the recess punched and illustrates the punch being withdrawn;

Figure 4 is a plan view on an enlarged scale showing a screw head completed as to punching and forming;

Figure 5 shows the step of shaving or finishing a screw of the flat head type;

Figure 6 shows an operation similar to Figure 5 being performed on a round head screw;

Figure 7 shows the result of the conventional shaving operation when applied to a recessed screw head in which no rounding of the junctions of the recess wall surfaces and the flat head surface has taken place; and Figure 8 illustrates the manner of shaving the undersurface only of a screw head.

This application is a division of my application Serial No. 50,042, filed November 15, 1935.

With the increased mechanization of industry there has been an active demand for a screw which can be driven by power machinery more satisfactorily than the conventional screw with a transverse kerf in the head. This kerf does not prevent lateral movement of the screw driver in the direction of the kerf length so that slippage may occur resulting in serious marring of the surface into which the screw is being driven by the rapidly rotating tool. Furthermore, such a screw cannot be satisfactorily held on the head of the driver for insertion in difficultly accessible places.

This demand has resulted in the production of screws having a recessed head, no portion of the recess extending to the edge of the head whereby lateral slippage of the tool is prevented. The most satisfactory of these screws are those having a recess of generally cruciform plan tapering slightly in width from top to bottom and having walls substantially straight.

In the manufacture of such screws it has heretofore been customary to punch the recess as a part of the head upsetting operation or just subsequent to the substantial finishing upset and to then machine the head on both its underneath and upper surfaces. The customary shaving operation, as applied to screws of the kerfed head type prior to the kerfing, which is carried out by advancing a tool substantially at right angles to the axis of the screw while rotating the same cannot be satisfactorily applied to the recessed screws. This is because the cutter in removing the metal adjacent to the edges of the recess throws down burrs or small shavings into the recess where they stick either because of fitting tightly into the wings of the recess or because they are not completely severed from the metal of the head and these burrs form obstructions to the entrance of the screw driver. It is difficult and expensive to remove them. Even small burrs and threads of metal prevent proper and accurate cohesion between the screw driver point and the recess so that there is a possibility of slippage.

In accordance with the present invention the operation which forms the recess in the screw head, and which is hereinafter called "punching", simultaneously forms a non-sharp junction between each surface of the recess and the surface of the head. This junction is formed conveniently by applying a fillet to the punch, at the junction of the punch nub and the head shaping shoulder which serves to finally form the head of the screw. During the last part of the punching operation the fillet forms the rounded edges at the periphery of the recess and provides an additional compressing and working of the metal thereat which has been shown to materially harden the same preventing subsequent burring by the action of the screw driver particularly in the case of a slippage. This is exceedingly important for such burrs sometimes are very sharp and where the screw heads are exposed, often catch clothing or other fabrics.

By now having reference to the drawing, the product and the process of forming the same will be more fully appreciated. In Figure 1 there is shown at 10 a blank comprising a section of cylindrical wire or rod of suitable metal from which the screw is adapted to be formed. This rod is held in the conventional anvil (not shown) and one end is struck by a suitable tool to upset it to form a bulbous head 11 as shown in Figure 2. While still held in the same anvil this head is subject to a punching or piercing operation from the punch 12 having the suitably formed nub 13 thereon surrounded by a shoulder 14. The nub 13 forms the desired shape of recess in the screw head and the shoulder 14 gives a final form to the screw head by shaping it to the desired configuration, flat, as shown in Figure 3, although screws of round, oval, fillister and other shaped heads can be formed in a similar manner.

The operation just described may be termed a two-stroke operation for forming and recessing the screw head although under certain conditions and for certain sizes of screws a three-stroke operation is preferred, the first stroke forming a less pronounced bulb than shown in Figure 2, the second substantially finishing the head as to shape, and the third punching it and completing the shaping.

Figure 4 shows in plan a screw head as formed by one of the described processes and it will be noted that the junctions of the flat surface 14' of the head and the various surfaces 15 of the walls of the recess are not sharp. They may be suitably curved to any desired radius, may be chamfered or otherwise configured so that they are other than sharp lines formed by the intersections of substantially flat surfaces. This shaping of these junctions is performed during the punching operation and substantially along with the final shaping of the head by the shoulder 14 on the punch and results from what may be termed a fillet 28 at the junction of the punch nub and the shoulder. As previously mentioned, the action of this fillet is a working and compressing of the metal at the surface junctions which not only hardens the same but forms the desired rounded edges at the periphery 16 of the recess 17.

Because of this relieving of the periphery, no fins are formed by the punching operation such as have been found to exist where this relieving does not take place. The screw is thus immediately ready for use for rough purposes without any further treatment except the customary threading which is the same as on all prior art screws. The rounded periphery of the recess being hardened, resists abrasion and burring by the action of the screw driver and ensures an easy entrance of the driver into the recess as well as provides a substantially flat head without any protruding slivers of metal.

This shaping of the periphery of the recess, however, has a further important advantage in the event that the screw head is to be finished by shaving. This shaving is a machine operation similar to turning wherein usually both the upper and lower surfaces of the head are shaped simultaneously by a single cutting tool presented to the head along a line substantially at right angles to the axis of the screw about which it is being rotated at the time of the cutting. This operation is shown in Figure 5 where the shank 10 of the screw is considered as being held in a chuck and rotated and the tool 18, having a surface 19 for cutting the underside of the screw head, is being advanced at right angles to the axis of rotation of the screw shank. The other cutting edge 20 of the tool is substantially parallel to the line of movement of the tool. The whole assembly is so adjusted that the edge 20 cuts through the curved junction 16 previously described substantially tangentially to the curve so that there is no tendency to throw in burrs or shavings only partially severed from the head and thereby clog the narrow wing passages in the recess.

Figure 7 shows the results of cutting with the customary shaving tool where the screw head is not formed with the rounded edges at the periphery of the recess and the turned-in burrs 21 can readily be seen.

Where screws have been made without the rounded surface at the periphery of the recess it has been customary in some cases to carry out the shaving operation with a shortened edge 20 on the tool which does not reach to the recess and to then finish off the remainder of the head around the recess with an end mill, but this is an additional operation and an added expense in the manufacture which is not justified in the product. In accordance with the present invention equally as fine a screw head is effected without any burrs and without the additional operation.

In Figure 6 a screw having a so-called round head 22 is shown but here the shaving takes place the same as in Figure 5 with the tool 23 having a straight cutting edge 24 for the flat undersurface of the screw head and an arcuate edge 25 for the curved upper portion of the head. In order that the cutting of this edge 25 may be substantially tangential to the curved surface at the junction of the screw head and recess walls, this curved surface may have to be more pronounced because of the curvature of the head, but its effect is as good with the flat headed screw and the articles are turned out rapidly and without the need of a further operation to clear the recess.

Where the heads of screws do not show in finished work the upper surface need not be finished more than the rough shaping resulting from the upsetting as previously described. This leaves a hard surface which is very desirable. It is sometimes desirable to finish the undersurface of the head in order to give a firm, accurate seating against the material into or through which the screw is inserted, although a fair finish results from the anvil surface used during the upsetting.

Figure 8 shows the manner of machining or shaving only the undersurface, for instance, of a so-called oval headed screw. The tool has a lip 26 which is unsharpened and acts only as a gauge in common with the shoulder 29 to provide accurate means for sizing the head while the cutting edge 27 acts alone to remove metal from only the underside of the head as shown.

It will be understood that the superior quality on the product is due to the rounded edges of the recess periphery and to the hardening of the same, all of which result from the novel process of forming the recess.

Having thus described the invention, what is claimed as new and desired to be secured by Letters Patent is:

1. As an article of manufacture, a screw having a head provided with a screw driver receiving recess having walls intersecting the surface of the head in cruciform arrangement, certain of said walls and their intersections being substantially radial, all of said intersections being relieved and the metal adjacent them and forming the periphery of the recess being compressed and hardened more than the remainder of the head.

2. As an article of manufacture, a screw having a head provided with an axial recess, the whole periphery of which is confined within the head, the normally exposed surface of the head and the surfaces of the recess walls meeting in junctions curved transversely, said junctions being formed and hardened as the result of a punching operation and the said surface of the head being formed as the result of a cutting operation wherein the cut is substantially tangent to the curve of said junctions.

EUGENE E. CLARK.